(12) United States Patent
McNeal et al.

(10) Patent No.: US 8,872,030 B2
(45) Date of Patent: Oct. 28, 2014

(54) CABLE MANAGEMENT SYSTEM

(71) Applicant: Tyco Electronics Corporation, Berwyn, PA (US)

(72) Inventors: Jeffrey Lane McNeal, Winston-Salem, NC (US); Stephen Scott Herndon, Danville, VA (US)

(73) Assignee: Tyco Electronics Corporation, Berwyn, PA (US)

( * ) Notice: Subject to any disclaimer, the term of this patent is extended or adjusted under 35 U.S.C. 154(b) by 0 days.

(21) Appl. No.: 13/930,867

(22) Filed: Jun. 28, 2013

(65) Prior Publication Data

US 2014/0001315 A1    Jan. 2, 2014

Related U.S. Application Data

(60) Provisional application No. 61/666,503, filed on Jun. 29, 2012.

(51) Int. Cl.
*H02G 3/04*    (2006.01)

(52) U.S. Cl.
USPC ............ 174/101; 174/50; 174/68.1; 248/49; 248/65; 248/68.1; 211/26; 361/826; 379/439

(58) Field of Classification Search
USPC ............ 248/49, 65, 68.1; 174/101, 50, 68.1; 312/323, 322; 211/26, 65; 361/826; 379/439
See application file for complete search history.

(56) References Cited

U.S. PATENT DOCUMENTS

| | | | |
|---|---|---|---|
| 4,717,112 A * | 1/1988 | Pirkle | 248/639 |
| 5,169,221 A * | 12/1992 | Wheeler | 312/323 |
| 6,230,903 B1 * | 5/2001 | Abbott | 211/26 |
| 6,431,668 B1 * | 8/2002 | Reddicliffe | 312/334.5 |
| 7,097,047 B2 * | 8/2006 | Lee et al. | 211/26.2 |
| 7,526,171 B2 * | 4/2009 | Caveney et al. | 385/135 |
| 7,687,716 B2 | 3/2010 | Pepe et al. | |
| 8,018,725 B2 | 9/2011 | Pepe et al. | |
| 2004/0035983 A1 * | 2/2004 | Simonson et al. | 248/49 |

* cited by examiner

*Primary Examiner* — Amy J Sterling
(74) *Attorney, Agent, or Firm* — Merchant & Gould P.C.

(57) ABSTRACT

A cable management system for a patch panel component having a connectivity interface configured to connect with cables includes a cable support plate and two cable support brackets. Each cable support bracket includes a support bar, a first bracket and a second bracket. A fastener hingedly attaches the first bracket to the second bracket and is positioned to slideably mount the first and second brackets to the support bar. The first and second brackets include mounting plates that move toward and away from one another when sliding the cable support brackets. The brackets mount to opposed projecting pins on a patch panel. The fastener holds each cable support bracket in the desired position.

9 Claims, 10 Drawing Sheets

CABLE MANAGEMENT SYSTEM

CROSS-REFERENCE TO RELATED APPLICATION

The present patent application claims the benefit of U.S. Provisional Patent Application Ser. No. 61/666,503, filed Jun. 29, 2012, which application is hereby incorporated by reference in its entirety.

FIELD OF THE INVENTION

The present invention relates to a cable management system, and more particularly, to cable support brackets for telecommunications cables.

BACKGROUND

Numerous cable management systems exist today and are used in various equipment applications, such as telecommunications, data transmission, networking, video and the like. Conventional cable management systems include a patch panel and a cable support bar that is coupled to the patch panel for managing cables on a rear of the patch panel. The cable support bar is mounted to the patch panel, such as with fasteners. There is a need for an improved cable management system having a cable support bar.

SUMMARY

The present invention provides a solution to cable management systems. A cable management system including a cable support device and a patch panel is disclosed. The cable support device includes two cable support brackets and a cable support plate. Each cable support bracket includes a support bar, a first bracket and a second bracket. An adjustable slide portion of the cable management system slides into place on each of the cable support brackets and causes a self-contained mechanical lock. The slide mechanism is integrated into the sides of the support bar.

In one implementation, the cable support plate slides forward and back to engage and disengage the brackets onto the patch panel. As the cable support device slides forward, mounting plates of the brackets are positioned over pins in the patch panel to be seated thereon. A fastener is used to lock the cable support device into place and prevent disengagement of the mounting plates from the patch panel.

DETAILED DESCRIPTION

Reference will now be made in detail to the exemplary aspects of the present disclosure that are illustrated in the accompanying drawings. Wherever possible, the same reference numbers will be used throughout the drawings to refer to the same or like structure.

Figure 1:
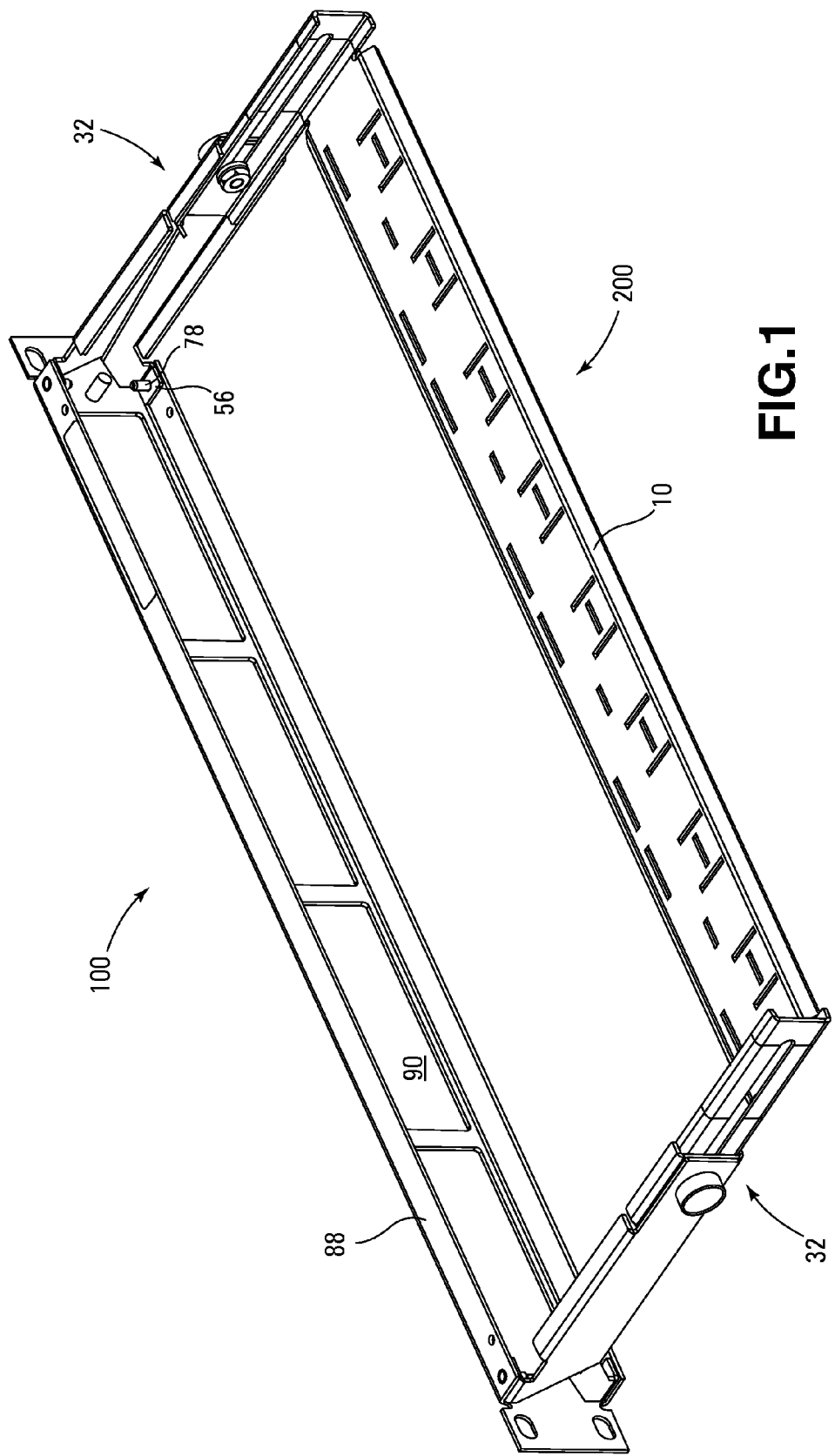
FIG. 1 is a perspective view of a cable support device assembled to a patch panel in an intermediate position according to the principles of the present invention.

FIG. 1 illustrates a cable management system 100 in accordance with the present disclosure. Cable management system 100 includes a cable support device 200 including a pair of opposing cable support brackets 32 assembled to a patch panel 88, and a cable support plate 10 that extends between cable support brackets 32. Each cable support bracket 32 is secured to patch panel 88 by hand and without the need of a separate tool. As such, each cable support bracket 32 is secured to patch panel 88 by a self-locking mechanism that is explained below in more detail.

Patch panel 88 can take many forms and include termination locations at front 90 in the form of copper jacks, fiber adapters, and copper or fiber modules or cassettes.

FIG. 1 is a depiction of each cable support bracket 32 engaged to a respective mounting post 58, 78 to secure a cable support device 200 to patch panel 88 or remove cable support 200 from patch panel 88. From the position in FIG. 1, cable support device 200 can be fully secured to patch panel 88 by pushing a cable support plate 10 toward patch panel 88. From the position in FIG. 1, cable support device 200 can be removed from patch panel 88 by pulling cable support plate 10 away from patch panel 88.

Cable management system 100 includes cable support plate 10 and two cable support brackets 32 where one cable support bracket 32 is on each end of cable support plate 10. Each cable support bracket 32 includes a support bar 12 defining an elongated slot 14 therein, a first bracket 34 including a first mounting plate 56 defining an opening 57, a second bracket 60 including a second mounting plate 76 defining an opening 77, and a fastener 82 which hingedly attaches first bracket 34 to second bracket 60. Fastener 82 is positioned in elongated slot 14 to slideably mount first bracket 34 and second bracket 60 to support bar 12. Support bar 12 includes an upper rail 20 and a lower rail 18, where first bracket 34 and second bracket 60 each include at least one rail to mate with at least one of upper rail 20 and lower rail 18 of support bar 12. The sliding movement of fastener 82 in elongated slot 14 causes first mounting plate 56 and second mounting plate 76 to move toward and away from one another. Upper rail 20 and lower rail 18 are parallel to one another.

Figure 2:
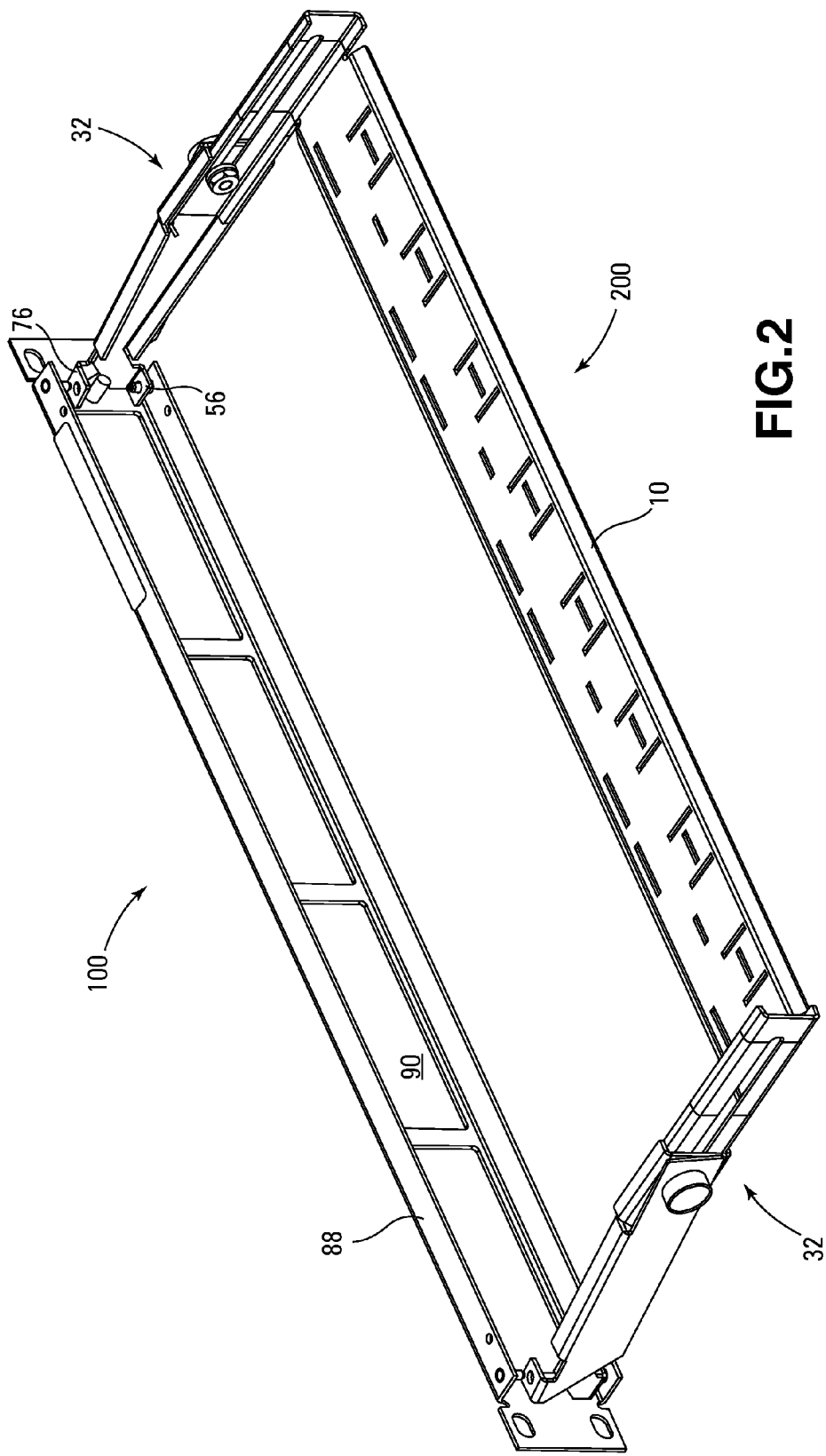
FIG. 2 is a perspective view of the cable support device unassembled to a patch panel in a fully collapsed position.
Figure 3:
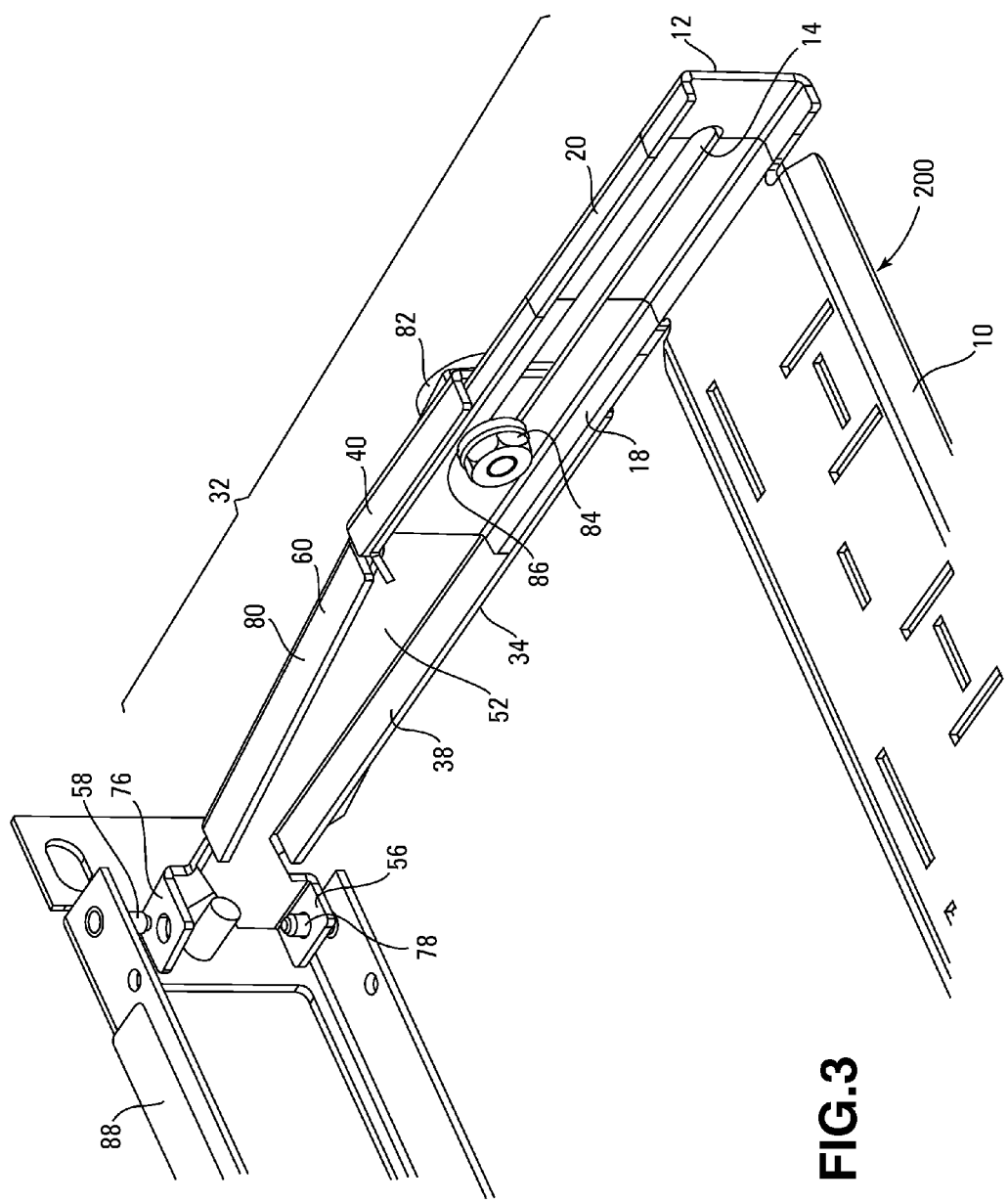
FIG. 3 is an enlarged view of the right cable support bracket shown in FIG. 2.
Figure 4:
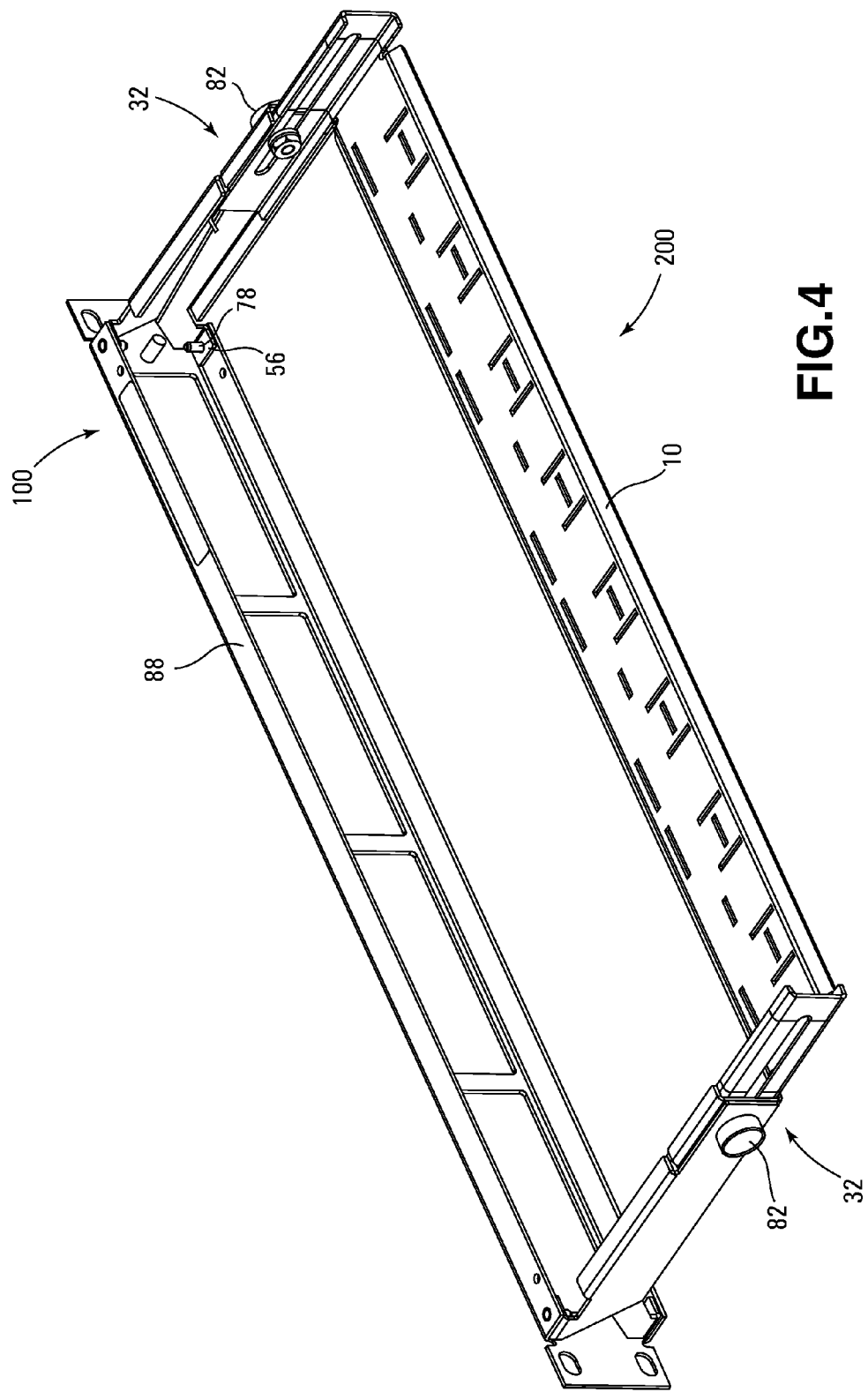
FIG. 4 is a perspective view of the cable support device assembled to the patch panel in an installed position.

Cable support device 200 engages patch panel 88 by a slide mechanism designed in each cable support bracket 32 on opposite ends of cable support plate 10 to provide a connection onto mounting posts 58, 78 of patch panel 88. Second bracket 60 pivots against a fixed first bracket 34 as cable support device 200 slides toward and away from patch panel 88. Each cable support bracket 32 slides relative to patch panel 88. To latch each cable support bracket 32 into place, cable support device 200 is pushed in toward patch panel 88 along elongated slot 14 of a support bar 12. Second mounting plate 76 of second bracket 60 moves into position over upper mounting post 58 while first mounting plate 56 of first bracket 34 is positioned over lower mounting post 78. FIG. 2 shows a perspective view of cable support device 200 with first bracket 34 and second bracket 60 positioned over upper mounting post 58 and lower mounting post 78 respectively. FIG. 3 shows an enlargement of this view. First bracket 34 remains fixed as second bracket 60 pivots against first bracket 34. Each cable support bracket 32 is movable from a locked position to an unlocked position by sliding toward or away from a patch panel 88.

Figure 5:
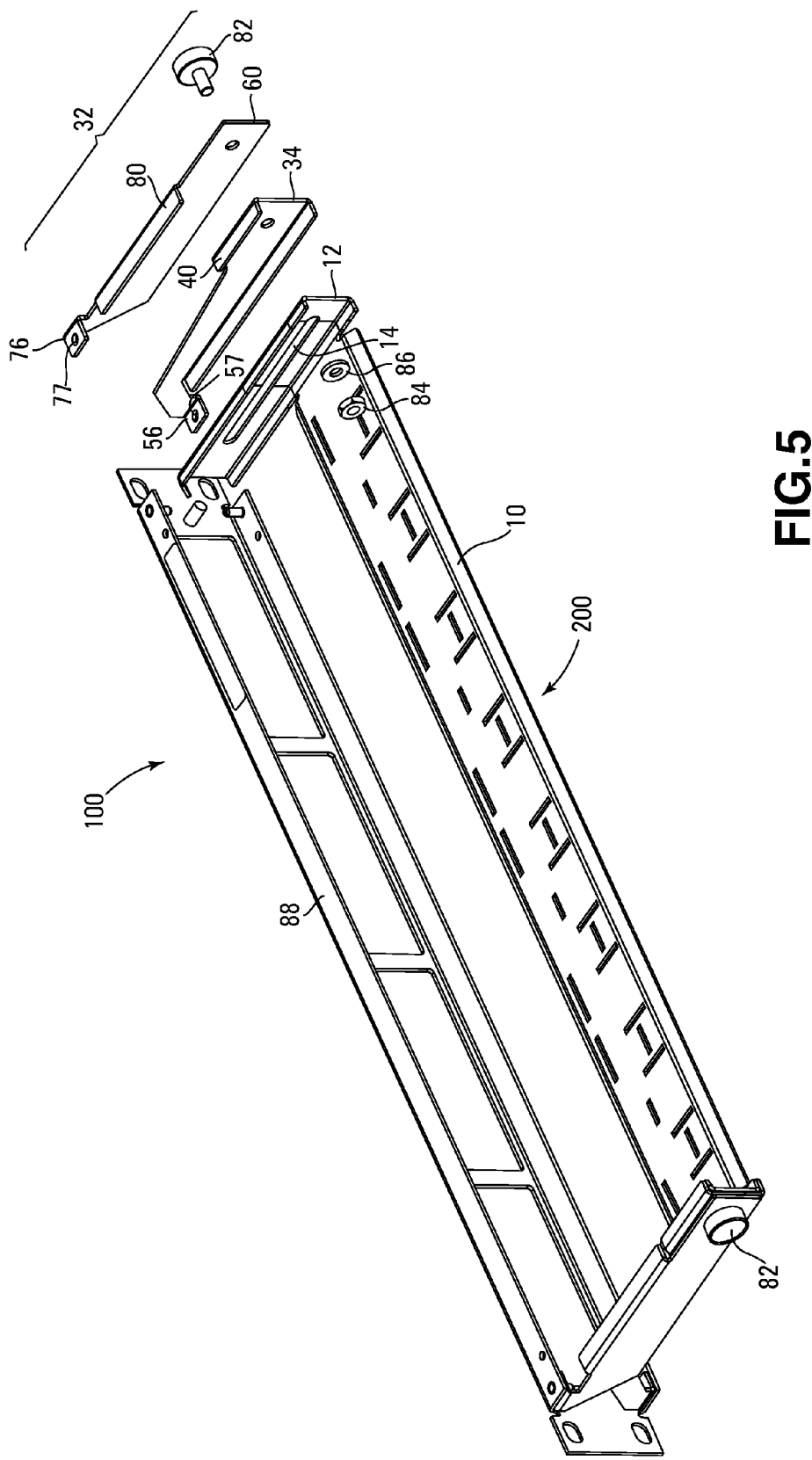
FIG. 5 is a partially exploded view of the cable support device assembled to the patch panel.

Referring now to FIG. 5, a partially exploded view of cable support device 200 unassembled to patch panel 88 is shown. Cable support device 200 includes cable support plate 10 and two cable support brackets 32 on opposite sides of cable support plate 10. Each cable support bracket 32 includes support bar 12, first bracket 34 and second bracket 60 configured to be movably coupled to one another as a self-locking mechanism. A locking mechanism 82 engages cable support bracket 32 to facilitate relative movement along an elongated slot 14 of support bar 12.

Figure 6:
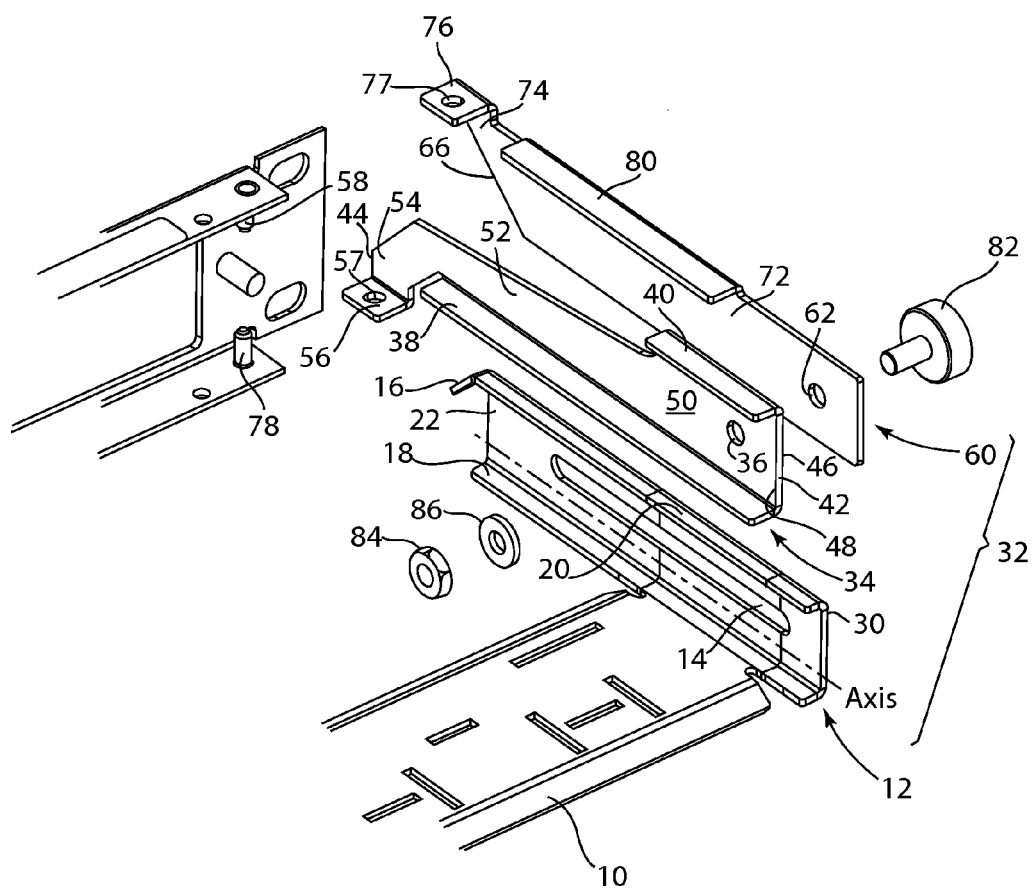
FIG. 6 is an enlarged view of the right cable support bracket shown in FIG. 5.

FIG. 6 is an enlarged view of exploded cable support bracket 32 shown in FIG. 5 detached from patch panel 88. Support bar 12 includes a lower rail 18 and an upper rail 20 that are opposing ends extending from a first upright wall 22 of support bar 12. First upright wall 22 defines an elongated slot 14 that extends along a horizontal axis. Parallel to upper rail 20 is a lever 16 that is angled downwardly to provide a lead in ramp for support bar 12 to slide into second bracket 60.

First bracket 34 is configured to receive support bar 12 where it will nest within a channel 50 of first bracket 34. First bracket 34 includes a second upright wall 52 having an inner surface 48 and an outer surface 46. Second upright wall 52 of first bracket 34 defines an opening 36. First bracket 34 extends between a front end 44 and a rear end 42. A top rail 40 of first bracket 34 extends from second upright wall 52 where top rail 40 and a bottom rail 38 of first bracket 34 are opposed. Top rail 40 is configured to capture upper rail 20 of support bar 12. Bottom rail 38 of first bracket 34 is configured to position along lower rail 18 of support bar 12.

First bracket 34 further includes a downwardly extending tab 54 adjacent and integral with second upright wall 52, and a first horizontal mounting plate 56 extending from second upright wall 52 and integral with downwardly extending tab 54 defining an opening 57 therein. First bracket 34 is coupled to support bar 12 such that an outer surface 30 of support bar 12 engages an inner surface 48 of first bracket 34. First upright wall 22 and second upright wall 52 engage one another, upper rail 20 of support bar 12 and top rail 40 of first bracket engage one another, and lower rail 18 of support bar 12 and bottom rail 38 of first bracket engage one another for horizontal sliding movement during use.

Second bracket 60 includes a rail 80 at a front end 66 thereof. Rail 80 is integrally formed with a third upright wall 72 and includes an upwardly extending tab 74. A second mounting plate 76 is adjacent and integral with upwardly extending tab 74 and defines an opening 77 therein.

Figure 7:
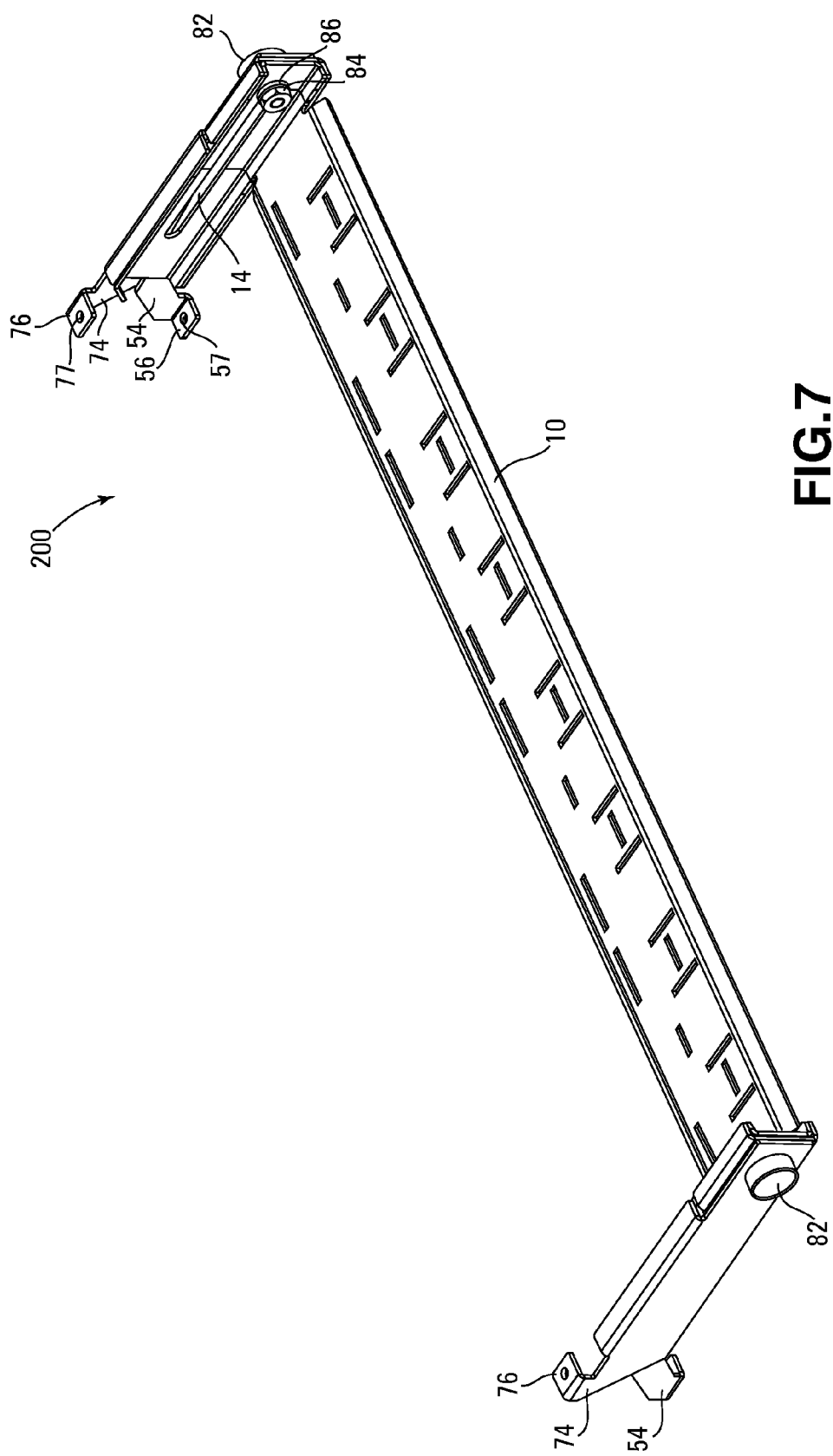
FIG. 7 is a perspective view of the cable support device in a fully engaged position.
Figure 8:
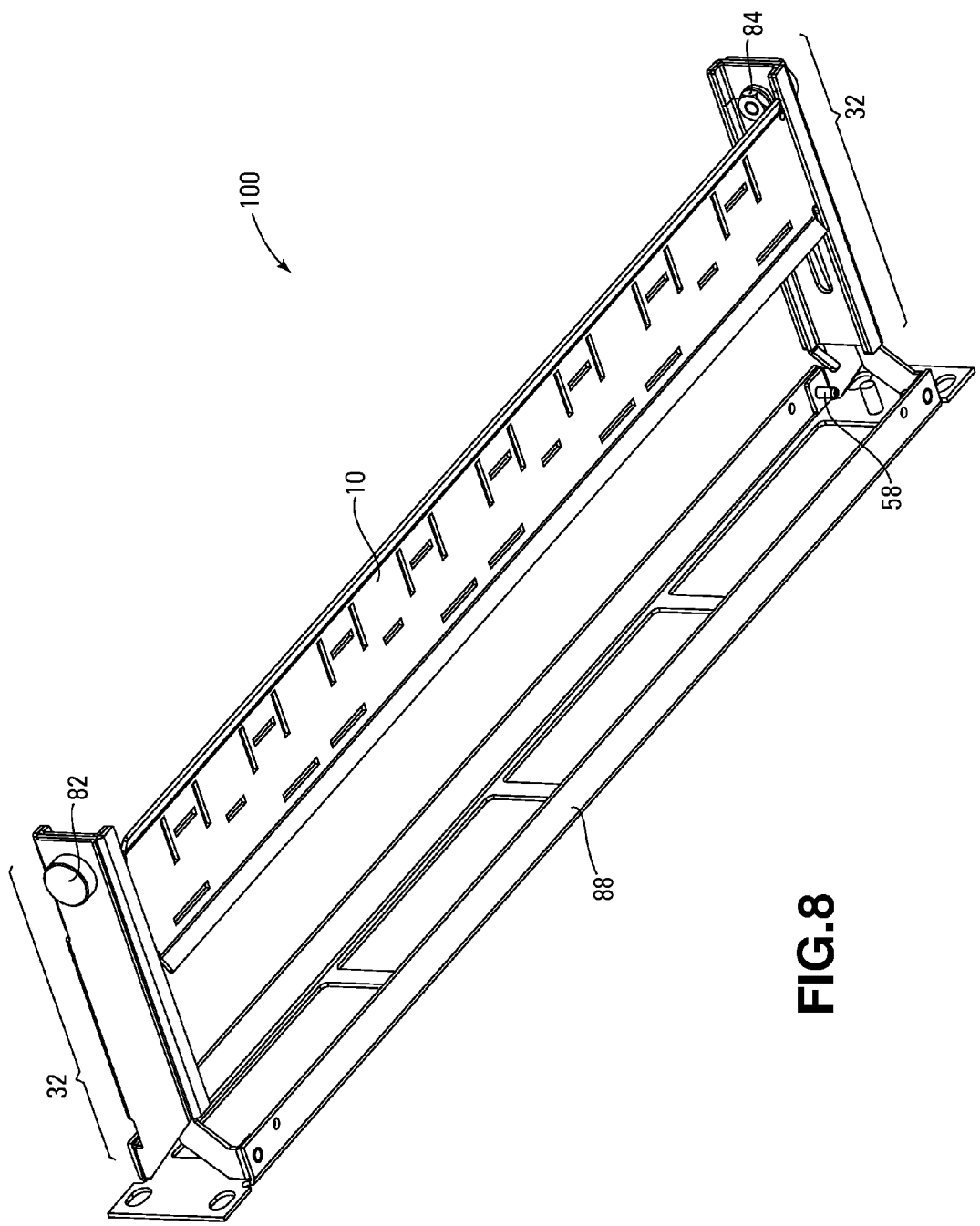
FIG. 8 is bottom perspective view of the cable support device assembled to a patch panel in a fully engaged position.
Figure 9:
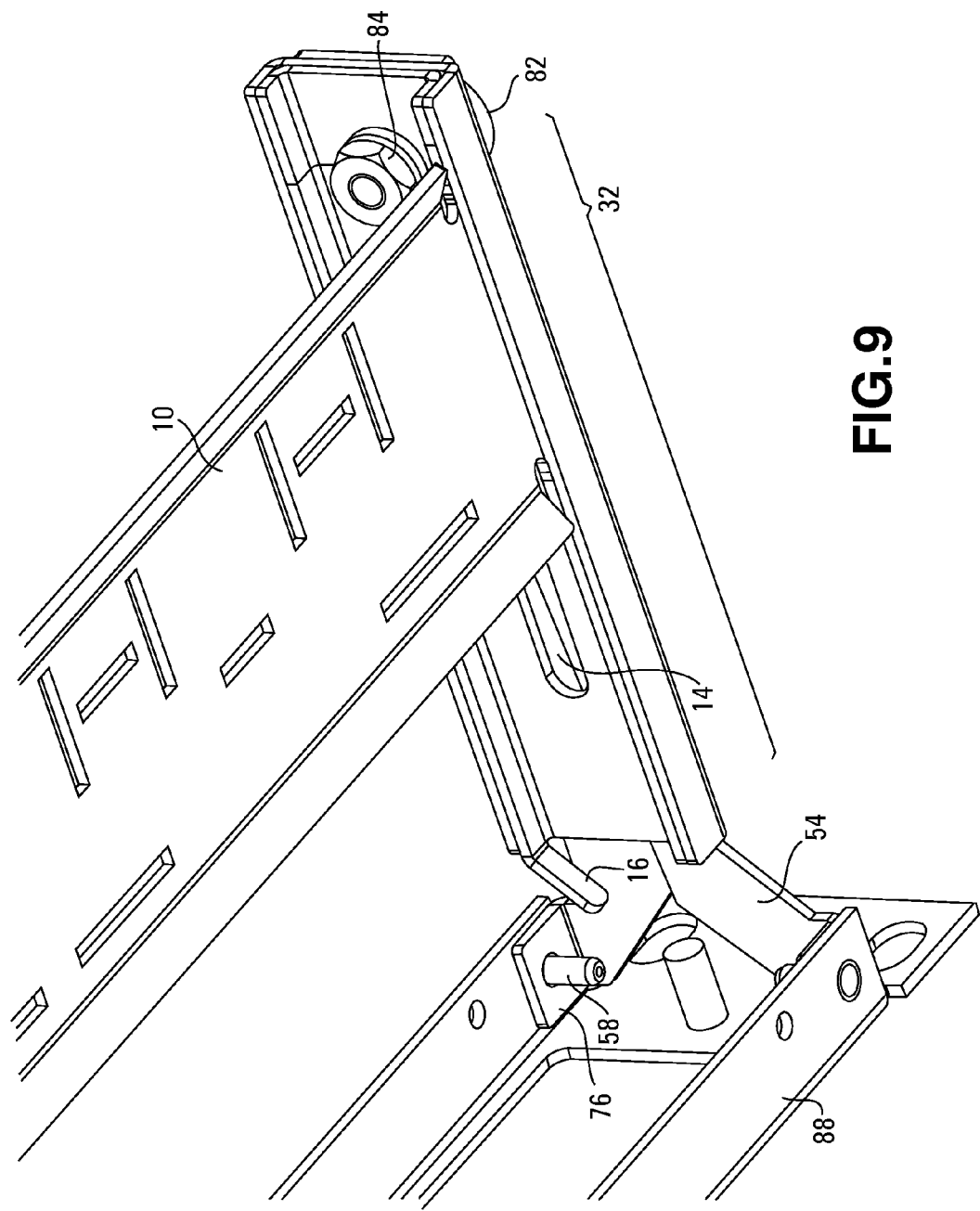
FIG. 9 is an enlarged view of the right cable support bracket shown in FIG. 8.
Figure 10:
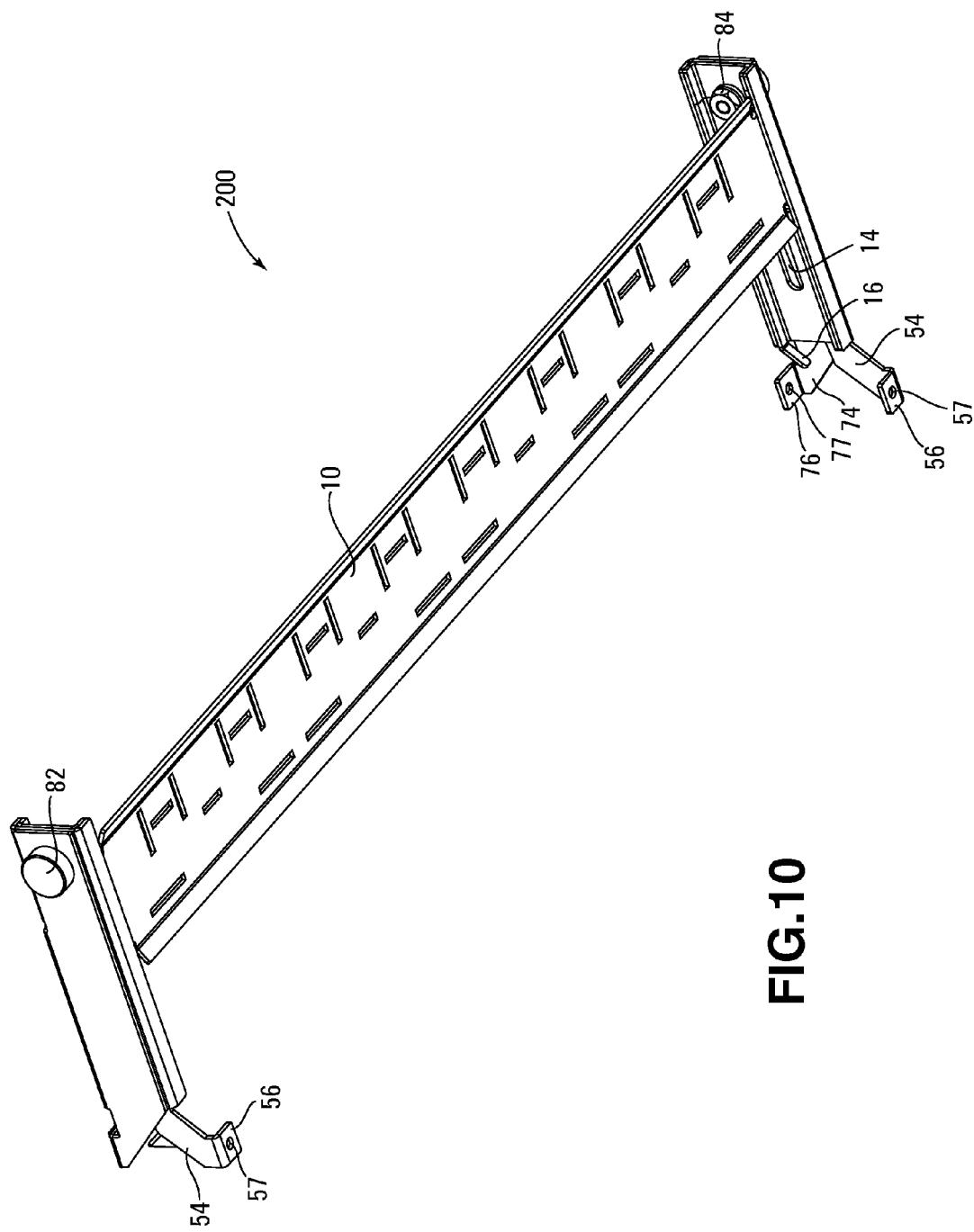
FIG. 10 is a bottom perspective view of the cable support device shown in FIG. 7.

FIG. 7 is a perspective view of cable support device 200 according to the present invention. First mounting plate 56 and second mounting plate 76 are both formed at approximately 90 degrees. Each mounting plate 56, 76 include a respective opening 57, 77 therethrough for receiving a respective upper and lower mounting post 58, 78 during assembly. FIG. 8 is an underside view of cable management system 100 showing second mounting plate 76 fully positioned over upper mounting post 58. FIG. 9 shows an enlarged view of FIG. 8 depicting an underside view of cable support bracket 32 connected to patch panel 88. FIG. 10 is an underside view of cable support device 200 unassembled to patch panel 88.

Second bracket 60 includes a third upright wall 72 defining an opening 62 along a longitudinal axis. A rail 80 extends from third upright wall 72, where rail 80 is configured to capture first bracket 34. Rail 80 of second bracket 60 is configured to slide over lever 16 of support bar 12 to provide pivoting and sliding movement of second bracket 60 with respect to first bracket 34.

Each cable support bracket 32 includes a fastener 82 configured to secure support bar 12, first bracket 34, and second bracket 60 together. Cable support bracket 32 is moveable along elongated slot 14 of support bar 12 and can be held in a desired position with fastener 82. Fastener 82 may be any type of fastener, such as a threaded fastener, a thumbscrew, a pin, a bolt, a dowel, a rivet, a latch, a wire tie, and the like. One fastener includes a thumbscrew used with a hex nut 84 and washer 86. During assembly, opening 36 of first bracket 34 is aligned with a corresponding opening 62 of second bracket 60 within slot 14 of support bar 12 and fastener 82 is used to securely couple first bracket 34, second bracket 60 and support bar 12 to one another. Openings 36, 62 are elongated such that first bracket 34 and second bracket 60 are moved linearly along slot 14 of support bar 12. Therefore, the relative positions of first bracket 34 and second bracket 60 are adjustable.

During assembly, when mounting each cable support bracket 32 to patch panel 88, cable support plate 10 is moved toward patch panel 88 causing first mounting plate 56 and second mounting plate 76 to mount to upper and lower mounting posts 58, 78 by positioning mounting plates 56, 76 over mounting posts 58, 78 such that the mounting posts 58, 78 are received within openings 57, 77. Cable support bracket 32 is moved into place and force mounting plates 56, 76 to spaced apart positions to mount cable support device 200 to patch panel 88. Fastener 82 holds cable support bracket 32 in position.

When removing cable support plate 10 from patch panel 88, fastener 82 is loosened and cable support plate 10 is pulled away from patch panel 88 and cable support bracket 32 will disengaged from mounting post 58, 78.

It is to be understood that the above description is intended to be illustrative, and not restrictive. For example, the above described embodiments (and/or aspects thereof) may be used in combination of each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description.

What is claimed is:

1. A cable management system comprising:
   a cable support plate;
   two cable support brackets, one cable support bracket on each end of the cable support plate, each cable support bracket including:
   a support bar defining an elongated slot;
   a first bracket including a first mounting plate defining an opening;
   a second bracket including a second mounting plate defining an opening;
   a fastener which hingedly attaches the first bracket to the second bracket;
   the fastener positioned in the elongated slot to slideably mount the first bracket and the second bracket to the support bar;
   wherein the support bar includes an upper rail and a lower rail;

wherein the first bracket and the second bracket each include at least one rail to mate with at least one of the upper rail and the lower rail of the support bar;

wherein sliding movement of the fastener in the elongated slot causes the first mounting plate and the second mounting plate to move toward and away from one another.

2. The cable management system according to claim 1, further comprising a patch panel with an upper mounting post and a lower mounting post on each end of the patch panel.

3. The cable management system according to claim 2, wherein the first mounting plate is positioned over the lower mounting post and the second mounting plate is positioned over the upper mounting post.

4. The cable management system according to claim 1, wherein the fastener includes a threaded fastener.

5. The cable management system according to claim 1, further comprising a lever that is angled downwardly to provide a lead in ramp for the support bar to slide into the second bracket.

6. A cable management system comprising:
a) two cable support brackets each including a support bar, a first bracket and a second bracket; wherein the first bracket and the second bracket are pivotably coupled to one another at a hinge, wherein the hinge is slidably coupled to an elongated slot in the support bar; and
b) a cable support plate, wherein each of the support bars are coupled to the cable support plate on opposite ends of the cable support plate, wherein the support bar includes:
1) a first upright wall being integral with the elongated slot, wherein the elongated slot extends along an axis;
2) an upper rail and a lower rail being opposed to one another extending from the first upright wall of the support bar; and
3) a lever extending from the upper rail;

wherein the first bracket includes:
1) a second upright wall of the first bracket;
2) a channel along an axis of the first bracket, wherein the channel is configured to receive the support bar;
3) a top rail and a bottom rail being opposed extending from the second upright wall of the first bracket, wherein the top rail is configured to capture the upper rail of the support bar, and the bottom rail of the first bracket is configured to be secured in position with respect to the lower rail of the support bar;
4) a downwardly extending tab adjacent to and integral with the second upright wall;
5) a first mounting plate extending from the second upright wall defining an opening therein;

wherein the second bracket includes:
1) a third upright wall of the second bracket;
2) a rail extending from the third upright wall of the second bracket, wherein the rail is configured to capture the first bracket;
3) an upwardly extending tab integral with the third upright wall of the second bracket;
4) a second mounting plate extending from the third upright wall defining an opening therein;

wherein the rail of the second bracket engages the lever of the support bar to allow movement of the second bracket with respect to the first bracket; and wherein each cable support bracket includes a fastener defining the hinge and configured to be received in the elongated slot, the fastener selectively positionable along the elongated slot to secure the first bracket and the second bracket together.

7. The cable management system according to claim 6, further comprising a patch panel with an upper mounting post and a lower mounting post on each end of the patch panel.

8. The cable management system according to claim 7, wherein the first mounting plate is positioned over the lower mounting post and the second mounting plate is positioned over the upper mounting post.

9. The cable management system according to claim 6, wherein the fastener includes a threaded fastener.

* * * * *